US012480016B2

(12) United States Patent
Konishi et al.

(10) Patent No.: US 12,480,016 B2
(45) Date of Patent: Nov. 25, 2025

(54) INK KIT

(71) Applicant: SAKATA INX CORPORATION, Osaka (JP)

(72) Inventors: Hiroyuki Konishi, Osaka (JP); Ryuta Noda, Osaka (JP); Masaki Murakami, Osaka (JP); Masahiro Ueki, Osaka (JP); Satoshi Hirakawa, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 237 days.

(21) Appl. No.: 18/547,324

(22) PCT Filed: Nov. 12, 2021

(86) PCT No.: PCT/JP2021/041674
§ 371 (c)(1),
(2) Date: Aug. 21, 2023

(87) PCT Pub. No.: WO2022/176286
PCT Pub. Date: Aug. 25, 2022

(65) Prior Publication Data
US 2024/0124735 A1 Apr. 18, 2024

(30) Foreign Application Priority Data
Feb. 22, 2021 (JP) ................................. 2021-026501

(51) Int. Cl.
*C09D 11/54* (2014.01)
*C09D 11/322* (2014.01)
*C09D 11/38* (2014.01)

(52) U.S. Cl.
CPC ............ *C09D 11/54* (2013.01); *C09D 11/322* (2013.01); *C09D 11/38* (2013.01)

(58) Field of Classification Search
CPC ....... C09D 11/40; C09D 11/322; C09D 11/38; C09D 11/033; C09D 11/54; B41M 5/0011; B41M 5/0017; B41J 2/01; B41J 3/4078
See application file for complete search history.

(56) References Cited

U.S. PATENT DOCUMENTS

| | | | | |
|---|---|---|---|---|
| 4,477,613 | A * | 10/1984 | Evans ................... | C08L 93/04 530/211 |
| 8,197,921 | B2 * | 6/2012 | Doi ...................... | B41J 2/0057 524/81 |
| 2005/0264629 | A1 * | 12/2005 | Fukuda ................ | C09D 11/38 347/100 |
| 2007/0225401 | A1 | 9/2007 | Sarkisian et al. | |
| 2012/0040148 | A1 | 2/2012 | Mozel et al. | |
| 2012/0218342 | A1 | 8/2012 | Ikeda et al. | |
| 2015/0175780 | A1 * | 6/2015 | Ahrens ................ | C09D 17/00 427/256 |
| 2018/0282564 | A1 | 10/2018 | Matsuzaki et al. | |
| 2019/0382606 | A1 | 12/2019 | Iraqi et al. | |
| 2020/0017703 | A1 * | 1/2020 | Ozawa .................... | B41J 2/155 |
| 2021/0002502 | A1 | 1/2021 | Kawai et al. | |
| 2021/0130629 | A1 * | 5/2021 | Suzuki .................... | B41M 5/00 |
| 2021/0403741 | A1 * | 12/2021 | Ozawa ................ | C09D 11/107 |
| 2022/0073773 | A1 | 3/2022 | Sarkisian et al. | |
| 2022/0243392 | A1 * | 8/2022 | Yamada ................ | D06P 1/445 |
| 2022/0389184 | A1 * | 12/2022 | Williams ............. | C09D 11/107 |
| 2024/0182738 | A1 | 6/2024 | Konishi et al. | |
| 2024/0409764 | A1 | 12/2024 | Murakami et al. | |

FOREIGN PATENT DOCUMENTS

| | | |
|---|---|---|
| CA | 3050628 A1 | 8/2018 |
| CN | 101415786 A | 4/2009 |
| EP | 3778797 A1 | 2/2021 |
| EP | 4424786 A1 | 9/2024 |
| JP | 2005001259 A | 1/2005 |
| JP | 2010194998 A | 9/2010 |
| JP | 2018165314 A | 10/2018 |
| JP | 2019177510 A | 10/2019 |
| JP | 006948484 B1 | 10/2021 |
| WO | 2011055595 A1 | 5/2011 |
| WO | 2019188855 A1 | 10/2019 |
| WO | 2020162947 A1 | 8/2020 |
| WO | 2021192452 A1 | 9/2021 |

OTHER PUBLICATIONS

International Search Report (ISR) mailed Dec. 28, 2021, issued for International application No. PCT/JP2021/041674. (2 pages).
International Preliminary Report on Patentability, dated Aug. 22, 2023, for corresponding international application PCT/JP2021/041674 (1 page).
Notification Concerning Transmittal of International Preliminary Report on Patentability, mailed Aug. 31, 2023, for corresponding international application PCT/JP2021/041674 (1 page).
Notification of Transmittal of Translation of the International Preliminary Report on Patentability, mailed Aug. 31, 2023, for corresponding international application PCT/JP2021/041674 (1 page).
Written Opinion of the International Searching Authority, mailed Dec. 28, 2021, for corresponding international application PCT/JP2021/041674 (3 pages).

(Continued)

*Primary Examiner* — John P Zimmermann
(74) *Attorney, Agent, or Firm* — Law Office of Katsuhiro Arai

(57) ABSTRACT

An object is to obtain an ink set capable of forming images of excellent image quality even when an acidic atmosphere, arising from use of a volatile acid in a pretreatment solution, is present in the vicinity of ink nozzles, etc. As a solution, an ink set containing a pretreatment solution and an ink composition is provided, wherein: the pretreatment solution contains an organic acid having a boiling point of 120° C. or lower at 1 atmospheric pressure; and the ink composition contains a pigment and an alkali-soluble resin having an acid value of 200 mgKOH/g or higher or crosslinked substance thereof accounting for 1.8% by mass or more in the ink composition, and further contains a water-dispersible resin and water.

4 Claims, No Drawings

(56) References Cited

OTHER PUBLICATIONS

Extended European Search Report (EESR) dated Jan. 31, 2025, issued for European counterpart patent application No. EP21926714.3 (6 pages).
A First Office Action with Search Report issued by the State Intellectual Property Office of China on Apr. 23, 2025, for Chinese counterpart application No. 202180093979.X (7 pages).

* cited by examiner

INK KIT

CROSS-REFERENCE TO RELATED APPLICATIONS

This application is the U.S. National Phase under 35 U.S.C. § 371 of International Application PCT/JP2021/041674, filed Nov. 12, 2021, which claims priority to Japanese Patent Application No. JP2021-026501, filed Feb. 22, 2021. The International Application was published under PCT Article 21 (2) in a language other than English.

TECHNICAL FIELD

The present invention relates to an ink set constituted by a pretreatment solution and an ink composition.

BACKGROUND ART

As described in Patent Literature 1, a pretreatment solution for inkjet recording that contains water-insoluble fine resin particles, malonic acid or other organic acid, crosslinking agent, and water, is public knowledge. It is claimed that images obtained using this pretreatment solution are free of ink bleeding and have excellent adhesion and laminating strength. Since achieving these effects is stated as an object, the pretreatment solution and ink composition proposed therein are for printing materials that are to be laminated. In such application, the printed areas, when the printed matter is used, exist inside the laminated product instead of being positioned at its outermost layer. Accordingly, the invention described in Patent Literature 1 is not intended to improve wear resistance and other effects in the printed areas.

Patent Literature 2 describes treating the surface of a material to be printed with an acidic pretreatment solution and then printing thereon using an inkjet recording ink. It is also described that various types of acids can be used to make the pretreatment solution acidic. However, print patterns that can be obtained by such printing are limited to bleed-free images, etc.

BACKGROUND ART LITERATURE

Patent Literature

Patent Literature 1: Japanese Patent Laid-open No. 2019-177510
Patent Literature 2: Japanese Patent Laid-open No. 2005-001259

SUMMARY OF THE INVENTION

Problems to be Solved by the Invention

An object of the present invention is to obtain an ink set capable of forming images of excellent image quality even when an acidic atmosphere, arising from use of a volatile acid in a pretreatment solution, is present in the vicinity of ink nozzles, etc.

Means for Solving the Problems

As a result of studying in earnest to achieve the aforementioned object, the inventors of the present invention found that the aforementioned object could be achieved with a specific compositional makeup, and ultimately completed the present invention.

Specifically, the present invention is as described below.

(1) An ink set constituted by a pretreatment solution and an ink composition, wherein: the pretreatment solution contains an organic acid having a boiling point of 120° C. or lower at 1 atmospheric pressure; and the ink composition contains a pigment, and an alkali-soluble resin having an acid value of 200 mgKOH/g or higher or crosslinked substance thereof accounting for 1.8% by mass or more in the ink composition, and further contains a water-dispersible resin and water.

(2) The ink set according to (1), wherein the water-dispersible resin is contained by 10.0 to 30.0% by mass in solids content in the ink composition.

(3) The ink set according to (1) or (2), wherein the water-dispersible resin is constituted by an acrylic-based resin and/or styrene acrylic-based resin having an acid value of 15 mgKOH/g or lower.

(4) The ink set according to any one of (1) to (3), made for inkjet printing.

(5) The ink set according to any one of (1) to (4), made for textile printing.

(6) The ink set according to any one of (1) to (5), wherein the alkali-soluble resin having an acid value of 200 mgKOH/g or higher is such that a ratio, by mass of constituent monomers, of (styrene)/(alkyl ester of radically polymerizable unsaturated carboxylic acid with 8 or more carbon atoms)/((meth)acrylic acid) is (35 to 55)/(25 to 35)/(15 to 35), or that of (alkyl ester of (meth)acrylic acid with fewer than 8 carbon atoms)/(acrylic acid)/(methacrylic acid) is (50 to 70)/(13 to 25)/(15 to 25).

Effects of the Invention

According to the ink set proposed by the present invention, excellent abrasion resistance of printed characters and images can be demonstrated, along with an effect (acid resistance) that allows for formation of images of excellent image quality, even in an atmosphere where a volatile organic acid is present, because the trajectory of the jetted ink composition discharged from the nozzle is not disturbed.

MODE FOR CARRYING OUT THE INVENTION

The ink set proposed by the present invention, representing an ink set constituted by a pretreatment solution and an ink composition, is explained below in order. The ink composition may be an ink composition for inkjet printing or for textile printing.

Glass transition temperature and weight-average molecular weight, as they relate to resins in this Specification, are defined below.

<Glass Transition Temperature>

Under the present invention, the glass transition temperature of a resin, when the resin is an acrylic-based copolymer resin, is a theoretical glass transition temperature obtained by Wood's equation below.

$$1/Tg = W1/Tg1 + W2/Tg2 + W3/Tg3 + \ldots + Wx/Tgx \quad \text{Wood's equation:}$$

(In the equation, $Tg1$ to $Tgx$ represent the glass transition temperatures of homopolymers comprising the resin's constituent monomers 1, 2, 3, ..., x, respectively, $W1$ to $Wx$ represent the polymerization ratios of monomers 1, 2, 3, ..., x, respectively, and $Tg$ represents the theoretical glass transition temperature. It should be noted that, in Wood's equation, glass transition temperatures are absolute temperatures.)

The glass transition temperature of a resin, when the resin is other than an acrylic-based copolymer resin, is a theoretical glass transition temperature obtained by thermal analysis. The method for thermal analysis conforms to JIS K 7121 (Testing Methods for Transition Temperatures of Plastics) and, as an example, the glass transition temperature can be measured using the Pyris 1 DSC manufactured by PerkinElmer, Inc., under the conditions of 20° C./min in rate of temperature rise and 20 mL/min in flow rate of nitrogen gas.

<Weight-Average Molecular Weight>

Under the present invention, the weight-average molecular weight of a resin can be measured according to the gel permeation chromatography (GPC) method. As an example, a chromatography is performed using the Waters 2690 (manufactured by Waters Corp.) as a GPC system, PLgel 5 μm MIXED-D (manufactured by Polymer Laboratories Inc.) as a column, tetrahydrofuran as a developing solvent, and an RI detector, under the conditions of 25° C. in column temperature, 1 mL/min in flow rate, 10 mg/mL in sample injection concentration, and 100 μL in injection volume, to obtain a weight-average molecular weight in terms of polystyrene.

<Pretreatment Solution>

The pretreatment solution included in the present invention contains an organic acid having a boiling point of 120° C. or lower at 1 atmospheric pressure, and it may also contain a surfactant.

(Organic Acid Having Boiling Point of 120° C. or Lower at 1 Atmospheric Pressure)

For the organic acid having a boiling point of 120° C. or lower at 1 atmospheric pressure used in the pretreatment solution, formic acid (boiling point at 1 atmospheric pressure 100.8° C.) and/or acetic acid (boiling point at 1 atmospheric pressure 118° C.) may be used.

Such organic acid is contained in the pretreatment solution by preferably 5.0% by mass or more, or more preferably 8.0% by mass or more. Also, it is contained by preferably 30.0% by mass or less, or more preferably 25.0% by mass or less. If the content of organic acid is too low, fixing of the resin in the ink composition printed thereon may take time. Meanwhile, if the organic acid is contained excessively, it may take time for the organic acid to evaporate after printing and for the free acids in the printed characters and images to disappear.

(Surfactant)

A surfactant may or may not be contained in the pretreatment solution. Among the surfactants that can be contained, anionic surfactants and nonionic surfactants are preferred. If a cationic surfactant or amphoteric surfactant is contained, it could constitute a salt with the aforementioned organic acid having a boiling point of 120° C. or lower at 1 atmospheric pressure.

The content of surfactant is 0 to 1.0% by mass, or preferably 0.01 to 1.0% by mass, or more preferably 0.1 to 0.7% by mass, relative to all pretreatment solution, for example.

Among the anionic surfactants, phosphate-based surfactants, alkenyl succinic acid-based surfactants, alkaline metal salts of alkylbenzene sulfonic acid, taurine-based surfactants, and alkaline metal salts of polyoxyethylene alkylphenyl sulfate, may be adopted.

Among the phosphate-based surfactants, phosphate ester-based surfactants are preferred, of which PLYSURF AL, PLYSURF DB-01, PLYSURF A219B, PLYSURF A208B, and PLYSURF 212C (DKS Co., Ltd.) may be used. An alkenyl succinic acid-based surfactant and/or taurine-based surfactant, etc., may be combined with a phosphate-based surfactant.

Among the alkenyl succinic acid and salts thereof, alkenyl succinic acid (Seiko PMC Corporation) and dipotassium alkenyl succinate (Kao Corporation) may be used.

Among the alkaline metal salts of alkylbenzene sulfonic acid, sodium dodecylbenzene sulfonate, etc., may be used.

Among the taurine-based surfactants, N-acyl taurine salt (Nikko Chemicals Co., Ltd.), LMT (sodium N-lauroyl methyl taurate), MMT (sodium N-myristoyl methyl taurate), PMT (sodium N-palmitoyl methyl taurate), and SMT (sodium N-stearoyl methyl taurate) may be contained.

Among the alkaline metal salts of polyoxyethylene alkylphenyl sulfate, sodium polyoxyethylene nonylphenyl sulfate, etc., may be used.

Among the nonionic surfactants, any one type, or two or more types, may be selected from silicone-based surfactants, fluorine-based surfactants, and acetylene-based surfactants.

The silicone-based surfactants include BYK-347, BYK-377, BYK-3455 (BYK Japan KK), etc.

The fluorine-based surfactants include, for example, F-410, F-444, F-553 (all manufactured by DIC Corporation), FS-65, FS-34, FS-35, FS-31, FS-30 (all manufactured by DuPont de Nemours, Inc.), etc.

Among the acetylene-based surfactants, any one type, or two or more types, may be selected from those commercially available under the product names of, for example, SURFYNOL 104E, SURFYNOL 104H, SURFYNOL 104A, SURFYNOL 104BC, SURFYNOL 104DPM, SURFYNOL 104PA, SURFYNOL 104PG-50, SURFYNOL 420, SURFYNOL 440, SURFYNOL 465 (EVONIK Industries AG), DYNOL 607, DYNOL 609, OLFINE E1004, OLFINE E1010, OLFINE E1020, OLFINE PD-001, OLFINE PD-002W, OLFINE PD-004, OLFINE PD-005, OLFINE EXP. 4001, OLFINE EXP. 4200, OLFINE EXP. 4123, OLFINE EXP. 4300 (Nissin Chemical Co., Ltd.), etc.

(Solvent)

For the pretreatment solution included in the present invention, water alone, or a mixed solvent consisting of water and water-soluble organic solvent, may be adopted as a solvent.

This water-soluble organic solvent may be, for example, a monoalcohol, polyalcohol, lower alkyl ether of polyalcohol, ketone, ether, ester, nitrogen-containing compound, etc. Any of these may be used alone, or two or more types may be combined.

The aforementioned monoalcohol may be methanol, ethanol, n-propanol, n-butanol, isobutanol, n-pentanol, n-hexanol, n-heptanol, n-octanol, n-nonylalcohol, n-decanol or isomer thereof, cyclopentanol, cyclohexanol, etc., where preferably an alcohol whose alkyl group has 1 to 6 carbon atoms can be used.

For the aforementioned polyalcohol, ethylene glycol, propylene glycol, 1,3-butylene glycol, 1,4-butylene glycol, 1,2-pentanediol, 1,5-pentanediol, neopentyl glycol, 1,2-hexanediol, 1,6-hexanediol, 1,2-cyclohexanediol, heptanediol, 1,8-octanediol, 1,9-nonanediol, 1,10-decanediol, glycerin, pentaerythritol, diethylene glycol, dipropylene glycol, triethylene glycol, tetraethylene glycol, polyethylene glycol, polypropylene glycol, thiodiglycol, etc., may be used.

For the aforementioned lower alkyl ether of polyalcohol, ethylene glycol monomethyl ether, ethylene glycol dimethyl ether, ethylene glycol monoethyl ether, ethylene glycol diethyl ether, ethylene glycol monopropyl ether, ethylene glycol isopropyl ether, ethylene glycol monobutyl ether, ethylene glycol isobutyl ether, propylene glycol monomethyl ether, propylene glycol monoethyl ether, propylene glycol-n-propyl ether, propylene glycol monobutyl ether, diethylene glycol monomethyl ether, diethylene glycol monoethyl ether, dipropylene glycol mono-n-propyl ether, dipropylene glycol mono-n-butyl ether, etc., may be used.

Preferably the aforementioned water-soluble organic solvent is kept to the lowest possible content, or it may not be blended in at all.

If the water-soluble organic solvent is blended in, its content is preferably 0 to 10.0% by mass, or more preferably 0 to 5.0% by mass, in the pretreatment solution. A content exceeding 10.0% by mass will lead to insufficient drying or lower blocking resistance.

(Other Component)

As other component, a water-soluble multivalent metal salt may or may not be contained in the pretreatment solution included in the present invention.

The water-soluble multivalent metal salt is an organic acid or inorganic acid salt of a multivalent metal, having a solubility in 100 mL of water at 20° C. of 1 g/100 mL or higher, or preferably 2 g/100 mL or higher, or more preferably 20 g/100 mL or higher.

The water-soluble multivalent metal salt may be a double salt or hydrate containing a multivalent metal.

The multivalent metal may comprise any one type, or two or more types, selected from magnesium, calcium, strontium, zinc, copper, iron, and aluminum, for example.

The organic acid for constituting the water-soluble multivalent metal salt may comprise any one type, or two or more types, of fatty acid(s) expressed by RCOOH (in the formula, R is hydrogen or an organic group with 1 to 30 carbon atoms), for example. Organic acids that are classifieds as such include formic acid, acetic acid, propionic acid, octylic acid, lauric acid, myristic acid, pentadecylic acid, palmitic acid, margaric acid, stearic acid, 12-hydroxystearic acid, recinoleic acid, oleic acid, vaccenic acid, linoleic acid, linolenic acid, arachidic acid, behenic acid, lignoceric acid, cerotic acid, montanic acid, melissic acid, lactic acid, citric acid, gluconic acid, malic acid, tartaric acid, succinic acid, malonic acid, glutaric acid, maleic acid, fumaric acid, glutaconic acid, benzoic acid, ascorbic acid, etc.

The inorganic acid may comprise any one type, or two or more types, selected from nitric acid, sulfuric acid, hydrogen chloride (hydrochloric acid), hydrogen bromide, hydrogen iodide, chloric acid, bromic acid, carbonic acid, and phosphoric acid, for example.

The water-soluble multivalent metal salt, when it is a multivalent metal salt of an organic acid, may comprise any one type, or two or more types, selected from zinc acetate, calcium acetate, strontium acetate, magnesium acetate, zinc formate, calcium formate, strontium formate, copper formate (II), magnesium formate, calcium benzoate, magnesium benzoate, zinc benzoate, calcium lactate, magnesium lactate, aluminum lactate, iron lactate (II), copper lactate, calcium ascorbate, magnesium ascorbate, calcium propionate, magnesium propionate, calcium gluconate, magnesium gluconate, zinc gluconate, copper gluconate, zinc citrate, copper citrate, and hydrates thereof, for example.

Also, the water-soluble multivalent metal salt, when it is a multivalent metal salt of an inorganic acid, may comprise any one type, or two or more types, selected from zinc chloride, aluminum chloride, calcium chloride, strontium chloride, iron chloride, copper chloride (II), nickel chloride, magnesium chloride, manganese chloride (II), zinc bromide, calcium bromide, strontium bromide, iron bromide (II), copper bromide (II), magnesium bromide, zinc iodide, calcium iodide, magnesium iodide, aluminum nitrate, calcium nitrate, strontium nitrate, iron nitrate (III), copper nitrate (II), magnesium nitrate, zinc sulfate, aluminum sulfate, iron sulfate (II), iron sulfate (III), copper sulfate, magnesium sulfate, potassium aluminum sulfate, calcium dihydrogen phosphate, and calcium hydrogen carbonate, for example.

The blending quantity of water-soluble multivalent metal salt can be adjusted as deemed appropriate according to the type of salt and purpose of blending it, and is not specifically limited.

The lower limit of the content of water-soluble multivalent metal salt is 0.1% by mass or higher, or preferably 0.5% by mass or higher, or more preferably 1% by mass or higher, in terms of solids content, in the pretreatment solution, for example. Also, the upper limit of the content of water-soluble multivalent metal salt is 20% by mass or lower, or preferably 15% by mass or lower, or more preferably 10% by mass or lower, in terms of solids content, in the pretreatment solution, for example.

The content of water-soluble multivalent metal salt is 0.1 to 20% by mass, or preferably 0.5 to 15% by mass, or more preferably 1 to 10% by mass, in terms of solids content, in the pretreatment solution, for example.

<Ink Composition>

(Pigment)

A pigment of each hue is added to the ink composition included in the present invention to obtain an ink composition of each color.

For such pigment, any pigment traditionally used in standard ink compositions can be used without specific limitations.

And, organic pigments include, for example, dye lake pigments, as well as azo-based, benzimidazolone-based, phthalocyanine-based, quinacridone-based, anthraquinone-based, dioxazine-based, indigo-based, thioindigo-based, perylene-based, perinone-based, diketopyrrolopyrrole-based, isoindolinone-based, nitro-based, nitroso-based, flavanthrone-based, quinophthalone-based, pyranthrone-based, indanthrone-based pigments, etc. Inorganic pigments include carbon black, titanium oxide, red iron oxide, graphite, iron black, chrome oxide green, aluminum hydroxide, etc.

Also, specific examples of pigments include the following.

Yellow pigments include, for example, C. I. Pigment Yellow 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, 213, etc., of which C. I. Pigment Yellow 150, 155, 180, 213, etc., are preferred.

Magenta pigments include, for example, C. I. Pigment Red 5, 7, 12, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, 270, C. I. Pigment Violet 19, etc., of which C. I. Pigment Red 122, 202, C. I. Pigment Violet 19, etc., are preferred.

Cyan pigments include, for example, C. I. Pigment Blue 1, 2, 3, 15, 15:1, 15:2, 15:3, 15:4, 15:6, 16, 18, 22, 27, 29, 60, etc., of which C. I. Pigment Blue 15:4, etc., are preferred.

Black pigments to be used for making a black ink composition include, for example, carbon black (C. I. Pigment Black 7), etc.

White pigments to be used for making a white ink composition include, for example, titanium oxide, aluminum oxide, etc., of which titanium oxide whose surface has been treated with alumina, silica or any of various other materials is preferred.

Preferably the content of pigment in the ink composition is 1.0 to 20.0% by mass relative to the total mass of the ink composition. If the content of pigment is under 1% by mass, the image quality of the obtained printed matters tends to drop. On the other hand, a content exceeding 20.0% by mass tends to negatively affect the viscometric property of the ink composition.

(Pigment Dispersant)

The ink composition included in the present invention may contain a pigment dispersant, if necessary.

A pigment dispersant is used to improve the pigment dispersibility as well as the storage stability of the ink composition under the present invention, and while any traditionally used pigment dispersant can be used without specific limitations, preferably one being a polymer dispersant is used. Pigment dispersants that are classified as such include carbodiimide-based dispersants, polyester amine-based dispersants, fatty acid amine-based dispersants, modified polyacrylate-based dispersants, modified polyurethane-based dispersants, multi-chain polymer nonionic dispersants, polymer ion activators, etc. Any of these pigment dispersants may be used alone, or two or more types may be combined.

Preferably the aforementioned pigment dispersant is contained by 1 to 200 parts by mass when the quantity of all pigment used represents 100 parts by mass. If the content of pigment dispersant is under 1 part by mass, the pigment dispersion, and the storage stability of the ink composition under the present invention, may drop. On the other hand, while it can be contained by over 200 parts by mass, doing so may not produce any difference in effects. A more preferable lower limit of the content of pigment dispersant is 5 parts by mass, while a more preferable upper limit is 60 parts by mass.

(Alkali-Soluble Resin Having Acid Value of 200 mgKOH/g or Higher or Crosslinked Substance Thereof)

The alkali-soluble resin having an acid value of 200 mgKOH/g or higher or crosslinked substance thereof may be, for example, an acrylic-based copolymer resin, maleic acid-based copolymer resin, condensation polymerization reaction-derived polyester resin, polyurethane resin, etc., or crosslinked substance thereof. The materials for synthesizing this alkali-soluble resin are disclosed in Japanese Patent Laid-open No. 2000-94825, for example, and acrylic-based copolymer resins, maleic acid-based copolymer resins, polyester-based resins, polyurethane-based resins, etc., obtained using the materials described in this publication can be utilized. Furthermore, resins obtained using materials other than the above can also be utilized. Any of the foregoing alkali-soluble resins may be used alone, or two or more types may be combined.

From the viewpoint of increasing the pigment dispersibility, the content of the alkali-soluble resin is preferably 5.0 parts by mass or higher, or more preferably 15.0 parts by mass or higher, relative to 100 parts by mass of the pigment. From the viewpoint of lowering the viscosity of the ink composition, the content of the alkali-soluble resin is preferably 100.0 parts by mass or lower, or more preferably 80.0 parts by mass or lower, or yet more preferably 60.0 parts by mass or lower, relative to 100 parts by mass of the pigment.

Among the acrylic-based copolymer resins, those obtained by polymerizing a mixture of an anionic group-containing monomer and other monomer copolymerizable therewith, in a solvent in the presence of a standard radical-generating agent (for example, benzoyl peroxide, tert-butyl peroxybenzoate, azobisisobutyronitrile, etc.) may be used, for example.

The anionic group-containing monomer may be, for example, a monomer having at least one type of anionic group selected from the group that consists of carboxyl group, sulfonic acid group, and phosphonic acid group, of which a monomer having carboxyl group is particularly preferred.

The monomer having carboxyl group may be, for example, acrylic acid, methacrylic acid, crotonic acid, itaconic acid, maleic acid, fumaric acid, 2-carboxyethyl (meth)acrylate, 2-carboxypropyl (meth)acrylate, maleic acid anhydride, fumaric acid anhydride, maleic acid half-ester, etc. Meanwhile, the monomer having sulfonic acid group may be, for example, sulfoethyl methacrylate, etc. Also, the monomer having phosphonic acid group may be, for example, phosphonoethyl methacrylate, etc.

For the other monomer copolymerizable with anionic group-containing monomer, preferably a hydrophobic group-containing monomer is contained from the viewpoint of improving the adsorptivity to pigment.

The hydrophobic group-containing monomer may be, for example, a monomer having long-chain alkyl group such as an alkyl ester of (meth)acrylic acid or other radically polymerizable unsaturated carboxylic acid with 8 or more carbon atoms (such as 2-ethylhexyl (meth)acrylate, octyl (meth) acrylate, lauryl (meth)acrylate, stearyl (meth)acrylate, 2-hydroxystearyl (meth)acrylate, etc.), alkyl vinyl ether with 8 or more carbon atoms (such as dodecyl vinyl ether, etc.) or vinyl ester of fatty acid with 8 or more carbon atoms (such as vinyl 2-ethylhexanoate, vinyl laurate, vinyl stearate, etc.); a monomer having alicyclic hydrocarbon group such as cyclohexyl (meth)acrylate, etc.; or a monomer having aromatic hydrocarbon group such as benzyl (meth)acrylate, styrene, α-methyl styrene, vinyl toluene or other styrene-based monomer, and the like. Any of the foregoing hydrophobic group-containing monomers may be used alone, or two or more types may be combined.

For the other monomer copolymerizable with anion group-containing monomer, a hydrophilic group-containing monomer may be contained from the viewpoint of inhibiting the cohesion of alkali-soluble resin in aqueous media.

The hydrophilic group-containing monomer may be, for example, a monomer having (poly)oxyalkylene chain such as an esterified product of methoxypolyethylene glycol, methoxypolyethylene polypropylene glycol, ethoxypolyethylene glycol, ethoxypolyethylene polypropylene glycol, propoxypolyethylene glycol, propoxypolyethylene polypropylene glycol or other single-end alkyl-capped (poly)alkylene glycol and (meth)acrylic acid or other radically polymerizable unsaturated carboxylic acid, ethylene oxide adduct and/or propylene oxide adduct to (meth)acrylic acid or other radically polymerizable unsaturated carboxylic acid, etc.; a basic group-containing monomer such as 1-vinyl-2-pyrrolidone, 1-vinyl-3-pyrrolidone or other vinylpyrrolidone, 2-vinylpyridine, 4-vinylpyridine, 5-methyl-2-vinylpyridine, 5-ethyl-2-vinylpyridine or other vinylpyridine, 1-vinylimidazole, 1-vinyl-2-methylimidazole or other vinylimidazole, 3-vinylpiperidine, N-methyl-3-vinylpiperidine or other vinylpiperidine, dimethylaminoethyl (meth)acrylate, diethylaminoethyl (meth)acrylate, tert-butylaminoethyl (meth)acrylate, (meth)acrylamide, N-methylol(meth)acrylamide, N-butoxymethyl(meth)acrylamide, N-methoxy(meth)acrylamide, N-ethoxy(meth)acrylamide, N-dimethylacrylamide, N-propylacrylamide or other nitrogen-containing derivative of (meth)acrylic acid; a monomer having hydroxyl group such as hydroxyethyl (meth)acrylate, hydroxypropyl (meth)acrylate or other hydroxyalkyl ester of (meth)acrylic acid; or a monomer having epoxy group such as glycidyl (meth)acrylate, for example. Any of the foregoing hydrophilic group-containing monomers may be used alone, or two or more types may be combined.

Other copolymerizable monomers besides the hydrophobic group-containing monomers and hydrophilic group-containing monomers include, for example, alkyl esters of methyl (meth)acrylate, ethyl (meth)acrylate, propyl (meth) acrylate, isopropyl (meth)acrylate, butyl (meth)acrylate, hexyl (meth)acrylate, cyclohexyl (meth)acrylate and other (meth)acrylic acids with fewer than 8 carbon atoms, etc. Any of the foregoing other copolymerizable monomers besides hydrophobic group-containing monomers and hydrophilic group-containing monomers may be used alone, or two or more types may be combined.

The alkali-soluble resin is such that the ratio, by mass of constituent monomers, of preferably (styrene)/(alkyl ester of radically polymerizable unsaturated carboxylic acid with 8 or more carbon atoms)/((meth)acrylic acid) is (35 to 55)/(25 to 35)/(15 to 35), or that of more preferably (styrene)/(lauryl acrylate)/(acrylic acid) is (35 to 55)/(25 to 35)/(15 to 35).

Or, preferably that of (alkyl ester of (meth)acrylic acid with fewer than 8 carbon atoms)/(acrylic acid)/(methacrylic acid) is (50 to 70)/(13 to 25)/(15 to 25), or more preferably that of (cyclohexyl acrylate)/(acrylic acid)/(methacrylic acid) is (50 to 70)/(13 to 25)/(15 to 25).

The alkali-soluble resin may use a bi- or higher functional crosslinking agent from the viewpoint of moderately crosslinking the resin to inhibit the cohesion of pigment, or it may not be crosslinked.

The bi- or higher functional crosslinking agent should have two or more reactive functional groups in the molecule, in order to react with the functional groups in the alkali-soluble resin. These reactive functional groups may be, for example, epoxy groups, hydroxy groups, isocyanate groups, amino groups, aziridine groups, etc. Furthermore, a crosslinking agent that has been dispersed, emulsified, or dissolved in water, or can be dispersed, emulsified, and/or dissolved in water, is particularly preferred. Any of the foregoing bi- or higher functional crosslinking agents may be used alone, or two or more types may be combined.

The acid value of the alkali-soluble resin is 200 mgKOH/g or higher, or more preferably 210 mgKOH/g or higher, or yet more preferably 220 mgKOH/g or higher, from the viewpoint of increasing the reactivity with the organic acid contained in the pretreatment solution. Also, the acid value of the alkali-soluble resin is preferably 300 mgKOH/g or lower, or more preferably 250 mgKOH/g or lower, or yet more preferably 240 mgKOH/g or lower, from the viewpoint of improving water resistance of the printed matters. It should be noted that the acid value represents a theoretical acid value corresponding to how much potassium hydroxide in milligrams is theoretically needed to neutralize 1 gram of the alkali-soluble resin, arithmetically obtained based on the compositional makeup of monomers used in synthesizing the alkali-soluble resin.

The glass transition temperature of the alkali-soluble resin is preferably 0° C. or higher, or more preferably 20° C. or higher, or yet more preferably 40° C. or higher, from the viewpoint of improving blocking resistance of the printed matters. The glass transition temperature of the alkali-soluble resin is preferably 100° C. or lower, or more preferably 80° C. or lower, or yet more preferably 60° C. or lower, from the viewpoint of improving bending tolerance property of the printed matters.

The weight-average molecular weight of the alkali-soluble resin is 5,000 or higher, or more preferably 8,000 or higher, or yet more preferably 13,000 or higher, from the viewpoint of improving water resistance of the printed matters. The weight-average molecular weight of the alkali-soluble resin is 50,000 or lower, or preferably 30,000 or lower, or more preferably 20,000 or lower, from the viewpoint of increasing solubility in aqueous media.

(Water-Dispersible Resin)

For the water-dispersible resin, one or more types selected from acrylic-based resin emulsion, styrene acrylic-based resin emulsion, polyurethane-based resin emulsion, and polyolefin-based resin emulsion may be adopted.

The percent solids content of the water-dispersible resin in the ink composition included in the present invention is preferably 10.0% by mass or higher, or more preferably 13.0% by mass or higher, from the viewpoint of improving print quality and abrasion resistance, while it is preferably 30.0% by mass or lower, or more preferably 25.0% by mass or lower, from the viewpoint of improving print quality.

Also, the percent solids content of the water-dispersible resin relative to the total quantity of resin and pigment in the ink composition included in the present invention is preferably 30.0% by mass or higher, or more preferably 40.0% by mass or higher, or yet more preferably 50.0% by mass or higher, or most preferably 60.0% by mass or higher, from the viewpoint of improving print quality and abrasion resistance. And, it is preferably 93.0% by mass or lower, or more preferably 90.0% by mass or lower, from the viewpoint of improving print quality.

Additionally, the acid value of the water-dispersible resin is preferably 20 mgKOH/g or lower, or more preferably 10 mgKOH/g or lower, or yet more preferably 5 mgKOH/g or lower, or most preferably 1 mgKOH/g or lower, or even 0 mgKOH/g, from the viewpoint of increasing acid resistance. It should be noted that the acid value represents a theoretical acid value corresponding to how much potassium hydroxide in milligrams is theoretically needed to neutralize 1 gram of the alkali-soluble resin, arithmetically obtained based on the compositional makeup of monomers used in synthesizing the alkali-soluble resin.

The acrylic-based resin emulsion is a polymer consisting of a mixture of one type, or two or more types, of monomer(s) selected from those listed below.

Examples include (meth)acrylic acid esters with alcohols having alkyl groups with 1 to 18 carbon atoms, 2-hydroxyethyl (meth)acrylate, 2-hydroxypropyl (meth)acrylate, methoxyethyl (meth)acrylate, butoxyethyl (meth)acrylate, glycidyl (meth)acrylate, allyl (meth)acrylate, ethylene glycol di(meth)acrylate, diethylene glycol di(meth)acrylate, etc. It should be noted that "(meth)acrylate" is a generic term referring to both acrylate and methacrylate. Additionally, the following ethylenic unsaturated monomers may be used together with the foregoing. Examples include acrylonitrile, vinyl acetate, vinyl propionate, styrene, acrylic acid, methacrylic acid, (meth)acrylamide, N-methylol(meth)acrylamide, N-methoxymethyl(meth)acrylamide, etc.

The styrene acrylic-based resin emulsion is an emulsion consisting of a styrene acrylic-based resin dispersed in water, and can be manufactured by means of emulsion polymerization, dispersion polymerization, suspension polymerization, pulverization, or solution/bulk polymerization, followed by emulsification.

Detailed information regarding these methods and stabilizers is found in "Emulsion Polymerization and Emulsion Polymers" (P. A. Lovell, M. S. El-Aasser, John Wiley & Sons Ltd., England, 1977, incorporated in this Specification by reference).

Commercial products representing the styrene acrylic-based resin emulsion include M6963 (manufactured by Japan Coating Resin Co., Ltd.), J-450, J-734, J-7600, J-352, J-390, J-7100, J-741, J-74J, J-511, J-840, J-775, HRC-1645, HPD-71, PDX-6102B, JDX-5050 (styrene acrylic-based resin emulsions, manufactured by BASF SE), UC-3900 (styrene acrylic-based resin emulsion, manufactured by TOAGOSEI Co., Ltd.), etc.

The polyurethane-based resin emulsion is an emulsion consisting of a polyurethane resin dispersed in water, and while any polyurethane-based resin emulsion of anionic, cationic, or nonionic in nature may be used, an anionic or nonionic polyurethane-based resin emulsion is preferred. Also, the polyurethane resin may be, for example, polyether-based polyurethane resin, polyester-based polyurethane resin, polyester/polyether-based polyurethane resin, polycarbonate-based polyurethane resin, etc. Any of the foregoing polyurethane-based resin emulsions may be used alone, or two or more types may be combined.

Commercial products representing the polyurethane-based resin emulsion include, for example, SUPERFLEX 210 (anionic polyester-based polyurethane resin, manufactured by DKS Co., Ltd.), SUPERFLEX 130 (anionic polyether-based polyurethane resin, manufactured by DKS Co., Ltd.), SUPERFLEX 500M (nonionic polyester-based polyurethane resin, manufactured by DKS Co., Ltd.), SUPERFLEX 460 (anionic polycarbonate-based polyurethane resin, manufactured by DKS Co., Ltd.), IMPRANIL DLP 1380 (anionic polyester-based polyurethane resin, manufactured by Sumika Covestro Urethane Co., Ltd.), BAYBOND PU 407 (anionic/nonionic polyester-based polyurethane resin, manufactured by Sumika Covestro Urethane Co., Ltd.), SUPERFLEX 420NS (anionic polycarbonate-based polyurethane resin, manufactured by DKS Co., Ltd.), SF460, SF460S, SF420, SF110, SF300, SF361 (polyurethane-based resin emulsions, manufactured by Nippon Unicar Co., Ltd.), W-6020, W-5025, W-5661, W-6010 (polyurethane-based resin emulsions, manufactured by Mitsui Chemicals, Inc.), R967, acid value 19 mgKOH/g (product name NeoRez R-967, polyether polyurethane-based emulsion (solids content concentration 40% by mass), manufactured by DSM NeoResins Inc.), etc.

The polyolefin-based resin emulsion is an emulsion consisting of a polyolefin-based resin dispersed in water. The polyolefin-based resin may be, for example, polyethylene resin, polypropylene resin, or polybutylene resin, or polyolefin resin copolymerized from two or more types selected from ethylene, propylene, and butylene. Also, the polyolefin resin may be, for example, a modified polyolefin resin having an amino-group, carboxyl-group, hydroxyl-group, acryloyl-group, or other polymer chain introduced to the polyolefin chain; oxidized polyolefin resin whose polyolefin chain is partially oxidation-treated; or halogenated polyolefin resin partially treated with halogen, and the like. Any of the foregoing polyolefin-based resin emulsions may be used alone, or two or more types may be combined.

Commercial products representing the polyolefin-based resin emulsion include, for example, CHEMIPEARL S100 (polyethylene-based resin emulsion, Mitsui Chemicals, Inc.), CHEMIPEARL XEP 800H (polypropylene-based resin emulsion, Mitsui Chemicals, Inc.), ARROWBASE TC-4010 (polypropylene-based resin emulsion, Unitika Ltd.), etc.

In the resin emulsion, AP4710 (acrylic silicone-based resin emulsion, manufactured by Showa Highpolymer Co., Ltd.) or other known resin emulsion used in ink compositions (other resin emulsion), besides the acrylic-based resin emulsion, styrene acrylic-based resin emulsion, polyurethane-based resin emulsion and polyolefin-based resin emulsion, may be contained to the extent that the effects of the present invention will not be impaired. Such other resin emulsion may be, for example, polyvinyl acetate-based resin emulsion, polyvinyl chloride-based resin emulsion, etc.

In the resin emulsion, the styrene acrylic-based resin emulsion and/or polyurethane-based resin emulsion account(s) for preferably 70% by mass or more, or more preferably 80% by mass or more, or yet more preferably 90% by mass or more, or most preferably 95% by mass or more, from the viewpoint of improving abrasion resistance and other coating film resistance properties.

(Surfactant)

The ink composition included in the present invention may contain any desired surfactant for the purpose of optimizing the printing or textile printing process, and also when it is to be applied as an inkjet ink composition, preferably a silicone-based surfactant or other surfactant traditionally used in ink compositions as a surfactant is contained, according to the inkjet head used, for the purpose of improving discharge stability.

Specific examples of silicone-based surfactants include polyether-modified silicone oil, polyester-modified polydimethylsiloxane, polyester-modified methylalkylpolysiloxane, etc. Any of these may be used alone, or two or more types may be combined.

The content of surfactant in the ink composition included in the present invention is preferably 0.005 to 1.0% by mass. If it is under 0.005% by mass, the ink composition included in the present invention will have high surface tension, resulting in lower discharge stability from the inkjet head. If it exceeds 1.0% by mass, on the other hand, more bubbles will generate in the ink composition, resulting in lower discharge stability.

(Additives)

Various additives may be added, if necessary, to the ink composition included in the present invention for the purpose of manifesting various types of functionalities. Specifically, they include surface conditioners, photostabilizers, surface-treatment agents, antioxidants, antioxidant agents, crosslinking promoters, polymerization inhibitors, plasticizers, preservatives, pH-adjusting agents, defoaming agents, humectants, etc. Additionally, a resin that functions as a vehicle but does not cure may or may not be blended in. Also, a solvent may or may not be contained.

<Basic Compound>

A basic compound may be contained in the ink composition included in the present invention from the viewpoint of dissolving the alkali-soluble resin. The basic compound may be, for example, sodium hydroxide, potassium hydroxide, or other inorganic basic compound; or ammonium, methylamine, ethylamine, monoethanolamine, N,N-dimethylethanolamine, N,N-diethylethanolamine, N,N-dibutylethanolamine, diethanolamine, N-methyldiethanolamine, triethanolamine, morpholine, N-methylmorpholine, N-ethylmorpholine or other organic basic compound, and the like. Any of the foregoing basic compounds may be used alone, or two or more types may be combined.

The percentage of the basic compound in the ink composition included in the present invention should be one that provides enough quantity to dissolve the alkali-soluble resin in the medium, but normally it is preferably 0.05% by mass or higher, or more preferably 0.1% by mass or higher, from the viewpoint of increasing dispersion stability of the alkali-soluble resin, while it is preferably 1% by mass or lower, or more preferably 0.5% by mass or lower, from the viewpoint of increasing water resistance of the printed matters.

Furthermore, in the ink composition included in the present invention, any known resin, pigment dispersant, antifungal agent, rustproofing agent, thickening agent, antioxidant, UV absorbent, storability improving agent, defoaming agent, pH adjusting agent, or other additive may be added according to the purpose.

<Method for Preparing Pretreatment Solution>

The pretreatment solution included in the present invention may be prepared by adding specified quantity(ies) of organic acid, as well as surfactant, etc., if necessary, to water in any desired order.

<Method for Preparing Ink Composition>

The method for preparing (manufacturing) the ink composition included in the present invention is not specifically limited, so long as the aforementioned components are added in sequence, or simultaneously, and then mixed. For example, the methods in (1) and (2) below may be adopted.

(1) A method for preparing the ink composition by mixing an aqueous resin varnish consisting of the alkali-soluble resin dissolved in water in the presence of the aforesaid basic compound, together with the pigment, and if necessary, a pigment dispersant, etc., and then preparing a pigment-dispersed liquid (ink base) using any of various types of dispersion machines such as ball mill, attritor, roll mill, sand mill, agitator mill, etc., followed by adding of the remaining materials.

(2) A method for preparing the ink composition by dispersing the pigment according to the aforementioned method and then using, for example, the acid precipitation method, or the ion-exchange means described in Domestic Re-publication of International Patent Laid-open No. WO2005/116147, to obtain a resin-coated pigment consisting of the pigment and the alkali-soluble resin precipitated thereon, after which the obtained resin-coated pigment is neutralized with a basic compound and redispersed in water using any of various types of dispersion machines (high-speed agitation device, etc.), followed by adding of the remaining materials.

The ink composition included in the present invention is such that its initial post-manufacturing viscosity is in a range of 2.0 to 15.0 mPa·s, or preferably 3.0 to 12.0 mPa·s. Viscosity may be measured using a type-E viscometer (product name RE100L Viscometer, manufactured by Toki Sangyo Co., Ltd.), for example.

(Method for Printing Using Ink Set Proposed by Present Invention>

The method for printing using the ink set proposed by the present invention comprises two processes, including a process in which the pretreatment solution is applied on the surface of a printing paper, resin film, or other target base material, and a process in which printing is performed using the ink composition.

The process in which the pretreatment solution is applied may be implemented by means of inkjet printing, or by other widely known method.

Regarding the relationship between these two processes, the process in which printing is performed using the ink composition may be implemented in a wet-on-wet mode where the applied pretreatment solution is not yet dry, or it may be implemented in a dry-on-wet mode meaning that the applied pretreatment solution is dried beforehand.

Examples

<Pretreatment Solutions>

Pretreatment solution 1 (100 parts by mass, consisting of 20 parts by mass of acetic acid, 0.2 parts by mass of SURFYNOL 440 (acetylene diol-based surfactant, HLB 8, manufactured by Evonik Industries AG), and purified water, mixed under agitation)

Pretreatment solution 2 (same as pretreatment solution 1, except that acetic acid accounts for 10 parts by mass)

Pretreatment solution 3 (same as pretreatment solution 1, except that acetic acid is replaced with lactic acid (organic acid whose boiling point exceeds 120° C. at 1 atmospheric pressure))

<Pigments>

JR-809 (product name JR-809, titanium oxide treated with silica and alumina, average particle size 0.23 μm, DBP oil absorption amount 24 mL/100 g, manufactured by TAYCA Co., Ltd.)

PF-690 (product name PF-690, titanium oxide treated with silica, alumina, and organic matter, average particle size 0.21 μm, DBP oil supply amount 16 mL/100 g, manufactured by Ishihara Sangyo Kaisha Ltd.)

HB890 (product name HIBLACK 890, average primary particle size 15 nm, DBP oil supply amount 95 mL/100 g, pH8.0, manufactured by Orion Engineered Carbons S.A.)

PB15:3 (Pigment Blue 15:3)

PR122 (Pigment Red 122)

PY14 (Pigment Yellow 14)

<Alkali-Soluble Resins>

Alkali-soluble resin 1 (a copolymer of cyclohexyl acrylate/acrylic acid/methacrylic acid of 65/16/19 with a weight-average molecular weight of 15000 and an acid value of 235 mgKOH/g)

Alkali-soluble resin 2 (a copolymer of cyclohexyl acrylate/acrylic acid/methacrylic acid of 65/16/19 with a weight-average molecular weight of 9500 and an acid value of 235 mgKOH/g)

Alkali-soluble resin 3 (copolymer of styrene/lauryl acrylate/acrylic acid of 51/30/19 with a weight-average molecular weight of 15800 and an acid value of 144 mgKOH/g)

Alkali-soluble resin 4 (a copolymer of styrene/lauryl acrylate/acrylic acid of 40/30/30 with a weight-average molecular weight of 30000 and an acid value of 220 mgKOH/g)

Alkali-soluble resin 5 (a copolymer of styrene/lauryl acrylate/acrylic acid of 45/30/25 with a weight-average molecular weight of 32000 and an acid value of 188 mgKOH/g)

<Alkali-Soluble Resin Varnishes>

25 parts by mass of alkali-soluble resin 1, sodium hydroxide of a mass corresponding to a neutralization equivalent of 100%, and purified water, were mixed to 100 parts by mass and then heated under agitation at 90° C. and dissolved, to obtain alkali-soluble resin varnish 1.

Similarly, 25 parts by mass of each of alkali-soluble resins 2 to 5, sodium hydroxide of a mass corresponding to a neutralization equivalent of 100% with respect to each alkali-soluble resin, and purified water, were mixed to 100 parts by mass and then heated under agitation at 90° C. and dissolved, to obtain each of alkali-soluble resin varnishes 2 to 5.

<Aqueous Ink Bases of Respective Colors>

As shown in Table 1, 50 parts by mass of JR-809, 40 parts by mass of alkali-soluble resin varnish 2, and 10 parts by mass of purified water, were mixed under agitation and then kneaded in a wet circulation mill, to prepare aqueous white ink base 1.

Similarly, as shown in Table 1, each pigment, each alkali-soluble resin varnish, and purified water, were mixed under agitation and then kneaded in a wet circulation mill, to prepare an aqueous ink base of each color.

<Water-Dispersible Resins>
  M6963 (product name M6963, styrene acrylic-based emulsion (solids content concentration 45% by mass), acid value under 10 mgKOH/g, manufactured by Japan Coating Resin Corporation)
  R967 (product name NeoRez R-967, polyether polyurethane-based emulsion (solids content concentration 40% by mass), acid value 19 mgKOH/g, manufactured by DSM NeoResins, Inc.)
<Solvents>
  Glycerin
  Propylene glycol
<Additive>
  E1010 (product name OLFINE E-1010, acetylenediol-based surfactant, HLB 13, manufactured by Nissin Chemical Industry Co., Ltd.)
<Ink Compositions>

The respective components were mixed under agitation as shown in Table 2, to obtain the ink compositions in the respective Examples and Comparative Examples. "Alkali-soluble resin varnish 2 (added later)" means alkali-soluble resin varnish 2 was added to the obtained ink compositions. "Alkali-soluble resin A" means an alkali-soluble resin having an acid value of 200 mgKOH/g or higher or crosslinked substance thereof, and "Alkali-soluble resin B" means an alkali-soluble resin other than Alkali-soluble resin A.

TABLE 1

| | 1 | 2 | 3 | 4 | | | | |
|---|---|---|---|---|---|---|---|---|
| Aqueous white ink base | 1 | 2 | 3 | 4 | | | | |
| Aqueous black ink base | | | | | 1 | | | |
| Aqueous blue ink base | | | | | | 1 | | |
| Aqueous red ink base | | | | | | | 1 | |
| Aqueous yellow ink base | | | | | | | | 1 |
| JR-809 | 50 | | 50 | 50 | | | | |
| PF-690 | | 50 | | | | | | |
| HB890 | | | | | 20 | | | |
| PB15:3 | | | | | | 20 | | |
| PR122 | | | | | | | 20 | |
| PY14 | | | | | | | | 20 |
| Alkali-soluble resin varnish 1 | | | | 40 | | | | |
| Alkali-soluble resin varnish 2 | 40 | | | | | | | |
| Alkali-soluble resin varnish 3 | | | 40 | | | | | |
| Alkali-soluble resin varnish 4 | | 40 | | | | | | |
| Alkali-soluble resin varnish 5 | | | | | 30 | 35 | 30 | 30 |
| Water | 10 | 10 | 10 | 10 | 50 | 45 | 50 | 50 |
| Total | 100 | 100 | 100 | 100 | 100 | 100 | 100 | 100 |

TABLE 2

| | | Examples | | | | | | | | | | Comparative Examples | | |
|---|---|---|---|---|---|---|---|---|---|---|---|---|---|---|
| | | 1 | 2 | 3 | 4 | 5 | 6 | 7 | 8 | 9 | 10 | 1 | 2 | 3 |
| Pretreatment solution | | 1 | 1 | 1 | 1 | 1 | 2 | 1 | 1 | 1 | 1 | 1 | 3 | 1 |
| Inks | Aqueous white ink base 1 | 18.0 | | | 18.0 | | 18.0 | | | | | | 18.0 | |
| | Aqueous white ink base 2 | | 18.0 | | | 18.0 | | | | | | | | |
| | Aqueous white ink base 3 | | | | | | | | | | | 18.0 | | |
| | Aqueous white ink base 4 | | | 18.0 | | | | | | | | | | |
| | Aqueous black ink base 1 | | | | | | | | 4.0 | | | | | 4.0 |
| | Aqueous blue ink base 1 | | | | | | | | | 4.5 | | | | |
| | Aqueous red ink base 1 | | | | | | | 4.0 | | | | | | |
| | Aqueous yellow ink base 1 | | | | | | | | | | 4.5 | | | |
| | M6963 | 45.0 | 45.0 | 45.0 | 25.0 | | 45.0 | 45.0 | 45.0 | 45.0 | 45.0 | 45.0 | 45.0 | 45.0 |
| | R967 | | | | | 30.0 | | | | | | | | |
| | Alkali-soluble resin varnish 2 (added later) | | | | | | | 7.2 | 7.2 | 7.2 | 7.2 | | | 5.6 |
| | Glycerin | 20.0 | 20.0 | 20.0 | 20.0 | 20.0 | 20.0 | 20.0 | 20.0 | 20.0 | 20.0 | 20.0 | 20.0 | 20.0 |
| | Propylene glycol | 10.0 | 10.0 | 10.0 | 10.0 | 10.0 | 10.0 | 10.0 | 10.0 | 10.0 | 10.0 | 10.0 | 10.0 | 10.0 |
| | E1010 | 0.2 | 0.2 | 0.2 | 0.2 | 0.2 | 0.2 | 0.2 | 0.2 | 0.2 | 0.2 | 0.2 | 0.2 | 0.2 |
| | Purified water | 6.8 | 6.8 | 6.8 | 26.8 | 21.8 | 6.8 | 13.6 | 13.1 | 13.6 | 13.1 | 6.8 | 6.8 | 15.2 |
| | Total | | | | | | | 100.0 | | | | | | |
| | Alkali-soluble resin A | 1.8 | 1.8 | 1.8 | 1.8 | 1.8 | 1.8 | 1.8 | 1.8 | 1.8 | 1.8 | | 1.8 | 1.4 |
| | Alkali-soluble resin B | | | | | | | | 0.3 | 0.4 | 0.3 | 0.34 | 1.8 | | 0.3 |
| Evaluation | Image quality | ○ | ○ | ○ | ○ | ○ | ○ | ○ | ○ | ○ | ○ | x | x | x |
| | Coating film resistance | ○ | ○ | ○ | x | x | ○ | ○ | ○ | ○ | ○ | Δ | x | ○ |

<Evaluation Methods>
(Image Quality)

White 100% cotton cloths were moistened with 10 g per A4 size of the pretreatment solutions in the Examples and Comparative Examples, and then dried by heating, to obtain printing media. The acids contained in the pretreatment solutions remained in the printing media even after they had been dried by heating. Generally, in an atmosphere where a volatile organic acid is present, the trajectory of an jetted ink composition discharged from a nozzle tends to be disturbed; whereas, if such disturbance in the trajectory does not occur, an effect that allows for forming of images of excellent image quality can be demonstrated.

The printing media were each printed with a solid image using an evaluation printer equipped with a Spectra printhead, and the ink compositions in each of the Examples and Comparative Examples, after which a nozzle check image was printed and the printing medium was changed. Subsequently, printing of an image, printing of a nozzle check image, and changing of the printing medium, were repeated 19 times.

To print a nozzle check image, a test image preset on the printer side was printed by a dedicated program from the printer side.

○: Even after 20 or more sheets of printing medium had been printed, discharge was confirmed from all nozzles when a nozzle check image was printed.

x: Within 20 sheets of printing medium after the start of printing, non-discharge or discharge with misdirection occurred in a nozzle(s) when a nozzle check image was printed.

(Coating Film Resistance)

A test (rubbing back and forth 100 times over a length of 100 mm with a load of 200 g) was conducted using a Type II tester according to the drying conditions per JIS L 0849, and the result was evaluated using the gray scale for assessing change in color.

○: Grade 4-5 to 5
Δ: Grade 3-4 to 4
x: Grade 3 or lower

According to Examples 1 to 10 representing examples that conform to the present invention, images, etc., of excellent image quality and coating film resistance can be formed. However, image quality was particularly poor according to Comparative Example 1 that used an ink composition containing only an alkali-soluble resin having an acid value of under 200 mgKOH/g, and Comparative Example 3 whose ink composition contained less alkali-soluble resin varnish.

Also, Comparative Example 2 that used an organic acid having a boiling point exceeding 120° C. at 1 atmospheric pressure, produced a poor result in both image quality and coating film resistance.

What is claimed:

1. An ink kit for inkjet printing, constituted by a pretreatment solution and an ink composition, wherein:
   the pretreatment solution contains an organic acid having a boiling point of 120° C. or lower at 1 atmospheric pressure; and
   the ink composition contains an alkali-soluble resin having an acid value of 200 mgKOH/g or higher or crosslinked substance thereof accounting for 1.8% by mass or more in the ink composition, and a pigment, and further contains a water-dispersible resin having an acid value of 20 mgKOH/g or lower by 10.0 to 30.0% by mass in solids content in the ink composition, and water.

2. The ink kit according to claim 1, wherein the water-dispersible resin is constituted by an acrylic-based resin and/or styrene acrylic-based resin having an acid value of 15 mgKOH/g or lower.

3. The ink kit according to claim 1, made for textile printing.

4. The ink kit according to claim 1, wherein the alkali-soluble resin having an acid value of 200 mgKOH/g or higher is such that a ratio, by mass of constituent monomers, of (styrene)/(alkyl ester of radically polymerizable unsaturated carboxylic acid with 8 or more carbon atoms)/((meth) acrylic acid) is (35 to 55)/(25 to 35)/(15 to 35), or that of (alkyl ester of (meth)acrylic acid with fewer than 8 carbon atoms)/(acrylic acid)/(methacrylic acid) is (50 to 70)/(13 to 25)/(15 to 25).

* * * * *